US010889157B2

(12) United States Patent
Kim et al.

(10) Patent No.: US 10,889,157 B2
(45) Date of Patent: Jan. 12, 2021

(54) BATTERY COOLING SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Kilwoo Lee, Seoul (KR); Wan Je Cho, Hwaseong-si (KR); Tae Hee Kim, Hwaseong-si (KR); Gun Goo Lee, Suwon-si (KR); Boram Yang, Pyeongtaek-si (KR); Yeon Ho Kim, Seoul (KR); Dong Seok Oh, Hwaseong-si (KR); Su Whan Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 25 days.

(21) Appl. No.: 16/369,188

(22) Filed: Mar. 29, 2019

(65) Prior Publication Data

US 2020/0180390 A1    Jun. 11, 2020

(30) Foreign Application Priority Data

Dec. 6, 2018 (KR) .......................... 10-2018-0156405

(51) Int. Cl.
*B60H 1/00* (2006.01)

(52) U.S. Cl.
CPC ..... *B60H 1/00278* (2013.01); *B60H 1/00921* (2013.01); *B60H 2001/00307* (2013.01); *B60H 2001/00928* (2013.01)

(58) Field of Classification Search
CPC ............ B60H 1/00278; B60H 1/00921; B60H 1/32284; B60H 1/3223; B60H 1/00392;
(Continued)

(56) References Cited

U.S. PATENT DOCUMENTS 5,537,956 A  *  7/1996  Rennfeld ........... B60H 1/00885
                                                      123/41.29
6,170,270 B1    1/2001  Arshansky et al.
(Continued)

FOREIGN PATENT DOCUMENTS

CN      103380339 A     10/2013
JP        5336033 B2    11/2013
KR    10-1195077 B1     10/2012

*Primary Examiner* — Travis C Ruby
(74) *Attorney, Agent, or Firm* — Morgan, Lewis & Bockius LLP

(57) ABSTRACT

A battery cooling system may include a first cooling device including a first radiator and a first water pump connected through a first coolant line and circulating a coolant in the first coolant line to cool at least one electrical component and at least one motor; a second cooling device including a second radiator and a second water pump connected through a second coolant line and circulating the coolant in the second coolant line; a battery module mounted on a battery coolant line selectively connectable to the second coolant line through a valve; and a chiller mounted on the battery coolant line and through which the coolant passes, connected to a refrigerant line of an air conditioning device through a refrigerant connection line, and making the coolant which selectively flows exchange heat with a refrigerant supplied from the air conditioning device to control a temperature of the coolant.

18 Claims, 5 Drawing Sheets

(58) Field of Classification Search
CPC ...... B60H 1/00885; B60H 2001/00307; B60H 1/00928; B60H 1/00121
See application file for complete search history.

(56) References Cited

U.S. PATENT DOCUMENTS

| | | | | |
|---|---|---|---|---|
| 6,347,528 | B1* | 2/2002 | Iritani | B60H 1/00357 |
| | | | | 62/324.6 |
| 7,789,176 | B2 | 9/2010 | Zhou | |
| 8,215,432 | B2 | 7/2012 | Nemesh et al. | |
| 8,336,319 | B2* | 12/2012 | Johnston | B60K 11/04 |
| | | | | 62/79 |
| 8,899,062 | B2* | 12/2014 | Kadle | B60H 1/00899 |
| | | | | 62/333 |
| 8,899,492 | B2* | 12/2014 | Kelty | H01M 10/633 |
| | | | | 236/34 |
| 9,109,840 | B2* | 8/2015 | Kadle | B60H 1/00899 |
| 9,239,193 | B2 | 1/2016 | Kadle et al. | |
| 9,533,544 | B2 | 1/2017 | Johnston | |
| 9,533,546 | B2* | 1/2017 | Cheng | H01M 10/6569 |
| 9,555,691 | B2* | 1/2017 | Tschismar | B60H 1/143 |
| 9,561,704 | B2* | 2/2017 | Enomoto | B60L 50/51 |
| 2005/0022983 | A1 | 2/2005 | Kadle et al. | |
| 2009/0020620 | A1* | 1/2009 | Douarre | B60H 1/00492 |
| | | | | 237/12.3 R |
| 2012/0174602 | A1* | 7/2012 | Olivier | B60H 1/005 |
| | | | | 62/79 |
| 2012/0180980 | A1* | 7/2012 | Malvicino | B60L 58/27 |
| | | | | 165/42 |
| 2012/0210746 | A1* | 8/2012 | Kadle | F28D 9/0093 |
| | | | | 62/498 |
| 2012/0216562 | A1* | 8/2012 | Kadle | F28D 9/005 |
| | | | | 62/434 |
| 2012/0304674 | A1* | 12/2012 | Schwarzkopf | B60H 1/32281 |
| | | | | 62/79 |
| 2013/0283838 | A1* | 10/2013 | Kadle | B60H 1/00899 |
| | | | | 62/238.6 |
| 2013/0319029 | A1* | 12/2013 | Sekiya | B60H 1/00899 |
| | | | | 62/238.7 |
| 2014/0190189 | A1* | 7/2014 | Kowsky | F25B 25/005 |
| | | | | 62/81 |
| 2015/0101789 | A1* | 4/2015 | Enomoto | B60L 1/003 |
| | | | | 165/202 |
| 2015/0273976 | A1* | 10/2015 | Enomoto | B60L 58/27 |
| | | | | 165/202 |
| 2016/0082805 | A1* | 3/2016 | Graaf | B60H 1/14 |
| | | | | 165/202 |
| 2016/0107508 | A1* | 4/2016 | Johnston | B60H 1/00278 |
| | | | | 165/202 |
| 2016/0339767 | A1* | 11/2016 | Enomoto | B60H 1/00278 |
| 2017/0158081 | A1* | 6/2017 | Kim | B60L 58/27 |
| 2017/0174038 | A1* | 6/2017 | Scheldel | B60H 1/32284 |
| 2017/0197488 | A1* | 7/2017 | Kim | B60H 1/00278 |
| 2017/0253105 | A1* | 9/2017 | Allgaeuer | B60H 1/00428 |
| 2018/0135916 | A1* | 5/2018 | Sueyoshi | F28D 9/005 |
| 2018/0178615 | A1* | 6/2018 | Xia | B60H 1/00392 |
| 2018/0208014 | A1* | 7/2018 | Ben Ahmed | B60H 1/3211 |
| 2018/0208061 | A1* | 7/2018 | Ben Ahmed | B60L 1/003 |
| 2018/0222286 | A1* | 8/2018 | Blatchley | B60H 1/00885 |
| 2018/0236842 | A1* | 8/2018 | Allgaeuer | B60H 1/004 |

* cited by examiner

BATTERY COOLING SYSTEM FOR VEHICLE

CROSS-REFERENCE TO RELATED APPLICATION

The present application claims priority to Korean Patent Application No. 10-2018-0156405 filed on Dec. 6, 2018, the entire contents of which is incorporated herein for all purposes by this reference.

BACKGROUND OF THE INVENTION

Field of the Invention

The present invention relates to a battery cooling system for a vehicle, and more particularly, to a heat pump system for a vehicle, which is used for efficiently heating or cooling a battery module by use of one chiller in which a coolant and cooling water exchange heat in an electric vehicle.

Description of Related Art

In general, an air conditioner for a vehicle includes an air conditioner system for circulating a refrigerant to heat or cool an interior of the vehicle.

Such an air conditioner system which maintains a comfortable interior environment by keeping a temperature of the interior of the vehicle at an appropriate temperature regardless of a temperature change of the outside, is configured to heat or cool the interior of the vehicle by heat-exchange by an evaporator while the refrigerant discharged by driving a compressor passes through a condenser, a receiver drier, an expansion valve, and the evaporator, and circulates to the compressor again.

That is, in the air conditioner system, a high-temperature and high-pressure gaseous refrigerant compressed by the compressor is condensed through the condenser and thereafter is evaporated in the evaporator through the receiver drier and the expansion valve to lower a temperature and humidity of the interior in a summer cooling mode.

Meanwhile, in recent years, as interest in energy efficiency and environmental pollution problems has been increasing, there has been a demand for the development of environmentally friendly vehicles capable of substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is generally referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle in the related art, a battery cooling system needs to be separately formed with a separate sealed circuit together with a cooler and the heat pump system to prevent the heat generation in the motor and electrical components, and the battery including the fuel cell.

Accordingly, a size and a weight of a cooling module disposed in the front of the vehicle increase and a layout of connection pipes that supply the refrigerant and the cooling water to the heat pump system, the cooler, and the battery cooling system is complicated in an engine compartment.

Furthermore, the battery cooling system, which heats or cools the battery according to a status of the vehicle such that the battery can show optimal performance is separately provided, and as a result, multiple valves for connection with the respective connection pipes are adopted and noise and vibration due to frequent opening/closing operations of the valves are transferred to the interior of the vehicle to degrade ride comfort.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a battery cooling system for a vehicle, which efficiently heats or cools a battery module by use of one chiller in which a coolant and a refrigerant exchange heat in an electric vehicle to increase an overall driving distance of a vehicle through efficient battery management.

Various aspects of the present invention are directed to providing a battery cooling system for a vehicle, which may include: a first cooling device including a first radiator and a first water pump connected through a first coolant line and circulating a coolant in the first coolant line to cool at least one electrical component and at least one motor; a second cooling device including a second radiator and a second water pump connected through a second coolant line and circulating the coolant in the second coolant line; a battery module mounted on a battery coolant line selectively connectable to the second coolant line through a valve; and a chiller mounted on the battery coolant line and through which the coolant passes, connected to a refrigerant line of an air conditioning device through a refrigerant connection line, and making the coolant which selectively flows exchange heat with a refrigerant supplied from the air conditioning device to control a temperature of the coolant, wherein a condenser provided in the air conditioning device is connected to each of the first and second coolant lines so that the coolant circulated in the first and second cooling devices passes through the first and second cooling devices, respectively, and the refrigerant passing through the condenser primarily exchanges heat with the coolant supplied through the first coolant line and secondarily exchanges heat with the coolant supplied through the second coolant line.

The air conditioning device may include: an HVAC module including an evaporator connected to the refrigerant line and having an opening/closing door for controlling outside air passing through the evaporator to selectively flow to the evaporator; a compressor connected to the evaporator through the refrigerant line; a first expansion valve mounted on the refrigerant line connecting the condenser and the evaporator; and a second expansion valve mounted on the refrigerant connection line.

A sub-condenser for additionally condensing the refrigerant passing through the condenser may be mounted on the refrigerant line between the condenser and the evaporator.

The second expansion valve may be operated when the battery module is cooled by the refrigerant, and the second expansion valve may expand the refrigerant which flows through the refrigerant connection line and make the expanded refrigerant flow into the chiller.

The valve may selectively connect the second coolant line and the battery coolant line between the second radiator and the chiller, a first branch line connecting the chiller and the battery module through the valve may be mounted on the battery coolant line, and a second branch line separating the battery coolant line and the second coolant line may be mounted on the second coolant line.

When the battery module is cooled by use of the coolant cooled by the second radiator, the valve may connect the second coolant line and the battery coolant line and close the first branch line.

When the battery module is cooled in a cooling mode of a vehicle, in the first cooling device, the coolant may be circulated in the electrical component and the motor through an operation of the first water pump, the first branch line may be opened through the operation of the valve, the second branch line may be opened, and connection between the second coolant line and the battery coolant line may be closed by the opened first and second branch lines, and in the air conditioning device, the refrigerant may be circulated and the second expansion valve may operate so that the expanded refrigerant flows into the chiller.

In the first cooling device, the coolant cooled by the first radiator may be supplied to the condenser through the operation of the first water pump.

In the second cooling device, the opened second branch line is connected to the second coolant line to form an independent closed circuit, and the coolant cooled by the second radiator may be supplied to the condenser through the operation of the second water pump.

When the battery module is heated, the operations of the first and second cooling devices and the air conditioning device may be stopped, and the first branch line may be opened through the operation of the valve and the connection between the second coolant line and the battery coolant line may be closed by the opened first branch line.

A heater may be mounted on the battery coolant line between the battery module and the chiller, and the heater may be turned on when heating the battery module and it may heat the coolant circulated in the battery coolant line, which flows into the battery module.

The condenser may include a first heat dissipation unit connected to the first coolant line, a second heat dissipation unit connected to the second coolant line, and a partition partitioning the internal to the condenser into the first heat dissipation unit and the second heat dissipation unit to prevent the coolants supplied from the first and second cooling devices, respectively, from being mixed and allowing the refrigerant to pass therethrough.

The condenser and the chiller may each be a water-cooled type of heat exchanger in which the coolant flows into the condenser and the chiller.

The second radiator may be disposed in front of the first radiator based on front and rear directions of the vehicle.

A first reservoir tank may be mounted on the first coolant line between the first radiator and the first water pump, and a second reservoir tank may be mounted on the second coolant line between the second radiator and the second water pump.

The valve may be a three-way valve.

The electrical component and the motor may be disposed on the first coolant line in series.

The motor may be constituted by two motors corresponding to a front wheel and a rear wheel, respectively, the electrical component may be constituted by two electrical components to correspond to the two motors, respectively, and of the two motors and two electrical components, one motor and one electrical component may be disposed in parallel with the other one motor and the other electrical component mounted on the first coolant line through a branch line mounted on the first coolant line.

The first water pump may be disposed on the first coolant line close to the first radiator based on the branch line, and a sub-water pump may be mounted on the first coolant line connected to the other one motor and the other one electrical component based on the branch line.

The electrical component may include a power control device, an inverter, or an on board charger (OBC).

As described above, according to an exemplary embodiment of the present invention, by a battery cooling system for a vehicle, a battery module is efficiently heated or cooled by use of one chiller in which a coolant and a refrigerant exchange heat in an electric vehicle, facilitating simplification of a system.

Furthermore, according to an exemplary embodiment of the present invention, the battery module is efficiently heated or cooled, facilitating showing optimal performance of the battery module and increasing an overall driving distance of a vehicle through efficient battery module management.

Furthermore, according to an exemplary embodiment of the present invention, condensing performance of a condenser is enhanced by dually condensing a coolant by use of each coolant supplied from a cooling device, enhancing cooling performance and reducing power consumption of a compressor.

Furthermore, according to an exemplary embodiment of the present invention, manufacturing cost may be reduced and weight may be reduced through simplification of an entire system, and spatial utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
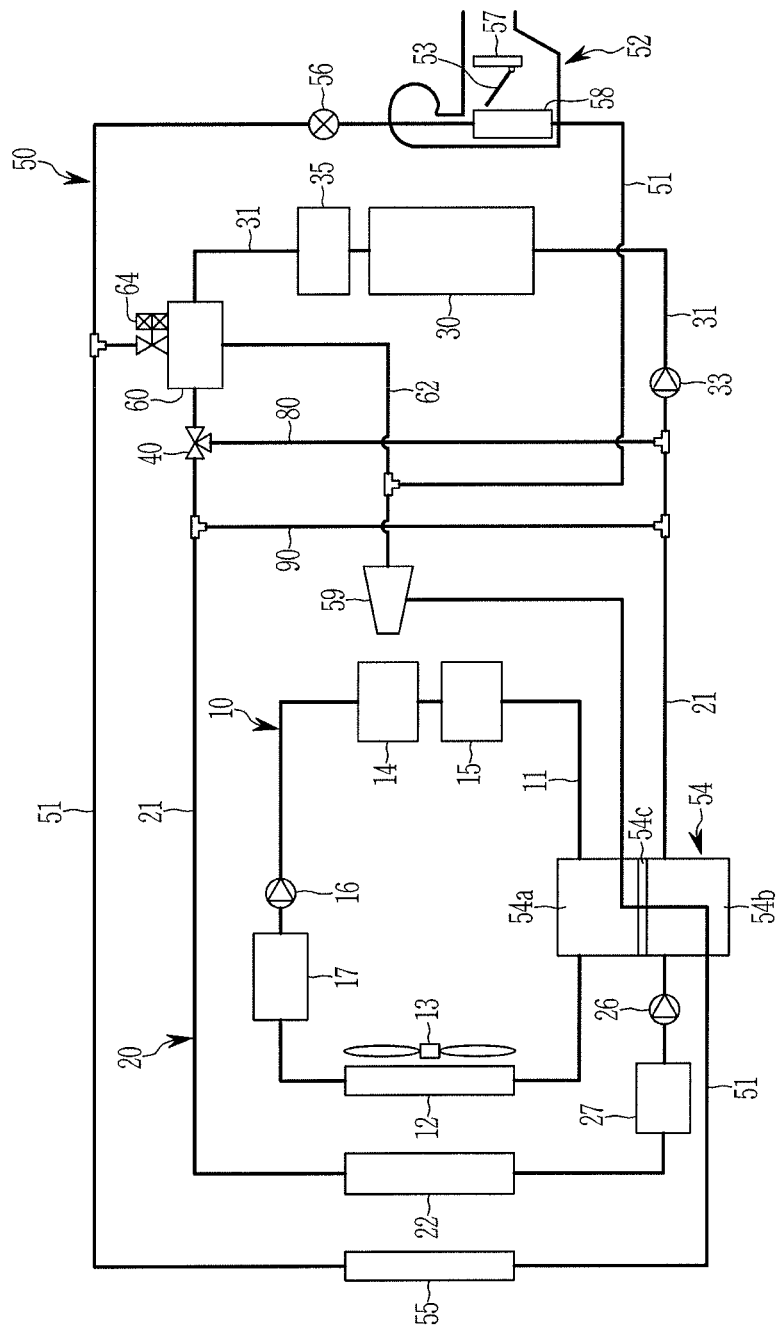
FIG. 1 is a block diagram of a battery cooling system for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Prior to this, configurations illustrated in the exemplary embodiments and drawings included in the exemplary embodiment are only exemplary embodiments of the present invention and do not represent all of the technical spirit of the present invention, and thus it is to be understood that various equivalents and modified examples, which may replace the configurations, are possible when filing the present application.

The drawings and description are to be regarded as illustrative in nature and not restrictive, and like reference numerals designate like elements throughout the specification.

Since size and thickness of each component illustrated in the drawings are arbitrarily represented for convenience in explanation, the present invention is not particularly limited to the illustrated size and thickness of each component and the thickness is enlarged and illustrated to clearly express various parts and areas.

Furthermore, throughout the specification, unless explicitly described to the contrary, the word "comprise" and variations such as "comprises" or "comprising" will be understood to imply the inclusion of stated elements but not the exclusion of any other elements.

In addition, the terms "unit", "means", "part", and "member", which are described in the specification, mean a unit of a comprehensive configuration that performs at least one function or operation.

FIG. 1 is a block diagram of a battery cooling system for a vehicle according to an exemplary embodiment of the present invention.

The vehicle battery cooling system according to the exemplary embodiment of the present invention efficiently manages a battery module 30 mounted on an electric vehicle to increase an overall driving distance of a vehicle.

Here, in the battery cooling system, a first cooling device 10 for cooling an electrical component 14 and a motor 15, a second cooling device 20 for cooling the battery module 30, and an air conditioning device 50 which is for cooling or heating an interior may interlock with each other in the electric vehicle.

In the exemplary embodiment of the present invention, the controller is connected to the air conditioning device 50 to control the operation of the air conditioning device.

That is, referring to FIG. 1, battery cooling system includes the first and second cooling devices 10 and 20, the battery module 30, and a chiller 60.

First, the first cooling device 10 includes a first radiator 12 and a first water pump 16 connected through a first coolant line 11. The first cooling device 10 circulates a coolant to the first coolant line 11 by operating the first water pump 16 to cool the electrical component 14 and the motor 15.

The first radiator 12 is disposed in the front of the vehicle, and a cooling fan 13 is provided behind the first radiator to cool the coolant through the operation of the cooling fan 13 and heat exchange with outside air.

Here, the electrical component 14 may include a power control device, an inverter, or an on board charger (OBC). The power control device and the inverter may dissipate heat while driving, and the OBC may dissipate heat when the battery module 30 is charged.

Meanwhile, in the exemplary embodiment of the present invention, the electrical component 14 and the motor 15 may be disposed on the first coolant line 11 in series.

Furthermore, a first reservoir tank 17 is mounted on the first coolant line 11 between the first radiator 12 and the first water pump 16. The coolant cooled by the first radiator 12 may be stored in the first reservoir tank 17.

The first cooling device 10 configured as such circulates the coolant cooled by the first radiator along the first coolant line 11 by operating the first water pump 16 to cool the electrical component 14 and the motor 15 to not be overheated.

In the exemplary embodiment of the present invention, the second cooling device 20 includes a second radiator 22 and a second water pump 26 connected through a second coolant line 21, and circulates the coolant through the second coolant line 21.

The second cooling device 20 may selectively supply the coolant cooled by the second radiator 22 to the battery module 30.

The second radiator 22 is disposed in front of the first radiator 12, and cools the coolant through the operation of the cooling fan 13 and heat exchange with the outside air.

Furthermore, a second reservoir tank 27 is mounted on the second coolant line 21 between the second radiator 22 and the second water pump 26. The coolant cooled by the second radiator 22 may be stored in the second reservoir tank 27.

The second cooling device 20 configured as such may circulate the coolant cooled by the second radiator 22 along the second coolant line 21 by operating the second water pump 26.

The battery module 30 is mounted on a battery coolant line 31 selectively connectable to the second coolant line 21 through a valve 40.

In the exemplary embodiment of the present invention, a controller is connected to the valve 40 to control the operation of the valve 40.

Here, the valve 40 may selectively connect the second coolant line 21 and the battery coolant line 31 between the second radiator 22 and the battery module 30.

The battery module 30 is formed as a water-cooled type in which electric power is supplied to the electrical component 14 and the motor 15, which are cooled by the coolant flowing along the battery coolant line 31.

That is, the battery module 30 is selectively connectable to the second cooling device 20 through the battery coolant line 31 according to the operation of the valve 40. In the battery module 30, the coolant may be circulated through the operation of a third water pump 33 mounted on the battery coolant line 31.

The third water pump 33 is mounted on the battery coolant line 31 between the chiller 60 and the battery module 30. The third water pump 33 operates to circulate the coolant through the battery coolant line 31.

Here, the first, second, and third water pumps 16, 26, and 33 may be electric water pumps.

In the exemplary embodiment of the present invention, a controller is connected to the first, second, and third water pumps 16, 26, and 33 to control the operation of the first, second, and third water pumps 16, 26, and 33.

In the exemplary embodiment of the present invention, the chiller 60 is mounted on the battery coolant line 31, the coolant passes through the internal to the chiller 60, and the chiller 60 is connected to a refrigerant line 51 of the air conditioning device 50 through a refrigerant connection line 62.

The chiller 60 makes the coolant selectively flowing into the chiller 60 exchange heat with the refrigerant supplied from the air conditioning device 50 to control a temperature of the coolant. Here, the chiller may be a water-cooled type of heat exchanger into which the coolant flows.

Meanwhile, in the exemplary embodiment of the present invention, a heater 35 may be mounted on the battery coolant line 31 between the battery module 30 and the chiller 60.

When the battery module 30 is required to be heated, the heater 35 is turned on to heat the coolant circulated in the battery coolant line 31 so that the coolant of which temperature is raised is made to flow into the battery module 30.

The heater 35 may be an electric heater that operates according to supply of electric power.

In the exemplary embodiment of the present invention, the controller is connected to the heater 35 to control the operation of the heater 35.

Furthermore, a first branch line 80 may be mounted on the battery coolant line 31, and connects each battery coolant line 31 between the chiller 60 and the battery module 30 through the valve 40.

Furthermore, a second branch line 90 is mounted on the second coolant line 21, and separates the battery coolant line 31 and the second coolant line 21 from each other.

The second branch line 90 may be selectively connectable to the second coolant line 21 so that the second cooling device 20 forms an independent closed circuit through the second coolant line 21.

Meanwhile, a separate valve may be provided at a point where the second branch line 90 intersects the second coolant line 21 and the battery coolant line 31, or on the second branch line 90. Such a valve may be a 3-way or 2-way valve.

Here, the valve 40 selectively connects the second coolant line 21 and the battery coolant line 31 or selectively connects the battery coolant line 31 and the first branch line 80 to control the flow of the coolant.

That is, when the battery module 30 is cooled using the coolant cooled by the second radiator 21, the valve 40 may connect the second coolant line 21 connected to the second radiator 21 and the battery coolant line 31 and close the first branch line 80.

Furthermore, when the battery module 30 is cooled by use of the coolant which exchanges heat with the refrigerant, the valve 40 may open the first branch line 80 and close connection between the second coolant line 21 and the battery coolant line 31.

Accordingly, low-temperature coolant that has exchanged heat with the refrigerant in the chiller 60 flows into the battery module 30 through the first branch line 80 opened by the valve 40, efficiently cooling the battery module 30.

On the other hand, when the battery module 30 is heated, the coolant circulated along the battery coolant line 31 through the operation of the valve 40 is prevented from flowing into the second radiator 22 to make the coolant heated through the operation of the heater 35 flow into the battery module 30, rapidly heating the battery module 30.

Meanwhile, in the exemplary embodiment of the present invention, it is described that the valve is not configured in the second branch line 90 as an exemplary embodiment of the present invention, but the present invention is not limited thereto, and the valve is applicable as necessary for selective opening of the second branch line 90.

That is, the second branch line 90 may control a flow rate of the coolant circulated through the operations of the second coolant line 21, the battery coolant line 31, and the first branch line 80 selectively connectable according to each mode (heating, cooling, or humidifying) of the vehicle and the second and third water pumps 26 and 33, thereby controlling opening and closing of the second branch line 90.

Meanwhile, in the exemplary embodiment of the present invention, the air conditioning device 50 includes a Heating, Ventilation, and Air Conditioning (HVAC) module 52, a condenser 54, a first expansion valve 56, an evaporator 58, and a compressor 59 connected through the refrigerant line 51.

First, the HVAC module 52 has therein an opening/closing door 53 connected through the refrigerant line 51 and controlling the outside air passing through the evaporator 58 to selectively flow into an internal heater 57 according to the heating, cooling, and heating/humidifying modes of the vehicle.

That is, the opening/closing door 53 is opened so that the outside air passing through the evaporator 58 flows into the internal heater 57 in the heating mode of the vehicle. On the other hand, in the cooling mode of the vehicle, the opening/closing door 53 closes the internal heater 57 so that the outside air which is cooled while passing through the evaporator 58 flows directly into the vehicle.

The condenser 54 is connected to the refrigerant line 51 so that the refrigerant passes through the refrigerant line 51, and the condenser 54 is connected to each of the first and second coolant lines 11 and 21 so that the coolant is circulated in each of the first and second cooling devices 10 and 20.

That is, the condenser 54 may be a water-cooled type of heat exchanger in which coolant flows into the condenser 54. The condenser 54 may include a first heat dissipation unit 54a, a second heat dissipation unit 54b, and a partition 54c.

First, the first heat dissipation unit 54a is connected to the first coolant line 11. As a result, the first heat dissipation unit 54*a* may make the refrigerant supplied from the compressor 59 primarily exchange heat with the coolant supplied from the first cooling device 10.

The second heat dissipation unit 54*b* is connected to the second coolant line 21. As a result, the second heat dissipation unit 54*b* may make the refrigerant passing through the first heat dissipation unit 54*a* secondarily exchange heat with the coolant supplied from the second cooling device 20.

Furthermore, the partition wall 54*c* may partition the first heat dissipation unit 54*a* and the second heat dissipation unit 54*b* in the condenser 54 to prevent the coolant supplied from each of the first cooling device 10 and the second cooling device 20 from being mixed. The partition 54*c* may make the refrigerant pass so that the refrigerant flows into the second heat dissipation unit 54*b* from the first heat dissipation unit 54*a*.

Therefore, the refrigerant that passes through the condenser 54 may primarily exchange heat with the coolant supplied through the first coolant line 11 and secondarily exchange heat with the coolant supplied through the second coolant line 21.

That is, the condenser 54 makes the refrigerant supplied from the compressor 59 primarily exchange heat with the coolant supplied from the first cooling device 10 to condense the refrigerant. As such, the condenser 54 makes the refrigerant secondarily exchange heat with the coolant supplied from the second cooling device 20 to condense the refrigerant. Through such an operation, the condenser 54 may lower the temperature of the refrigerant and increase a condensation amount.

Meanwhile, a sub-condenser 55 for additionally condensing the refrigerant passing through the condenser 54 may be mounted on the refrigerant line 51 between the condenser 54 and the evaporator 58.

The sub-condenser 55 is disposed in front of the second radiator 22, and exchanges heat between the refrigerant flowing into the sub-condenser 55 and the outside air. That is, the sub-condenser 55 may be an air-cooled type of heat exchanger.

Accordingly, the sub-condenser 55 further condenses the refrigerant condensed by the condenser 54 to increase sub-cooling of the refrigerant, and as a result, a coefficient of performance (COP) which is a coefficient of cooling performance to power required by the compressor may be enhanced.

In the exemplary embodiment of the present invention, the first expansion valve 56 is mounted on the refrigerant line 51 connecting the sub-condenser 55 and the evaporator 58. The first expansion valve 56 receives and expands the refrigerant passing through the sub-condenser 55. The first expansion valve 56 may be a mechanical expansion valve.

The compressor 59 is connected between the evaporator 58 and the condenser 54 through the refrigerant line 51. The compressor 59 compresses a gaseous refrigerant.

Meanwhile, a second expansion valve 64 may be mounted on the refrigerant connection line 62.

That is, the second expansion valve 64 is mounted on the refrigerant connection line 62 connecting the sub-condenser 55 and the chiller 60.

Here, the second expansion valve 64 is operated when the battery module 30 is cooled by the refrigerant in the cooling mode of the vehicle. The second expansion valve 64 may expand the refrigerant flowing through the refrigerant connection line 62 and make the expanded refrigerant flow into the chiller 60.

That is, the second expansion valve 64 expands the condensed refrigerant discharged from the sub-condenser 55, and makes the expanded refrigerant flow into the chiller 60 in a state where the refrigerant is lowered in temperature, further lowering a water temperature of the coolant passing through the inside the chiller 60.

Accordingly, the coolant having the lowered water temperature flows into the battery module 30 while passing through the chiller 60, so that the battery module may be cooled more efficiently.

Hereinafter, the operation and action of the battery cooling system for a vehicle according to the exemplary embodiment of the present invention configured as such will be described in detail with reference to FIG. 2, FIG. 3 and FIG. 4.

First, an operation when the battery module is cooled using the coolant in the battery cooling system for a vehicle according to the exemplary embodiment of the present invention will be described with reference to FIG. 2.

Figure 2:
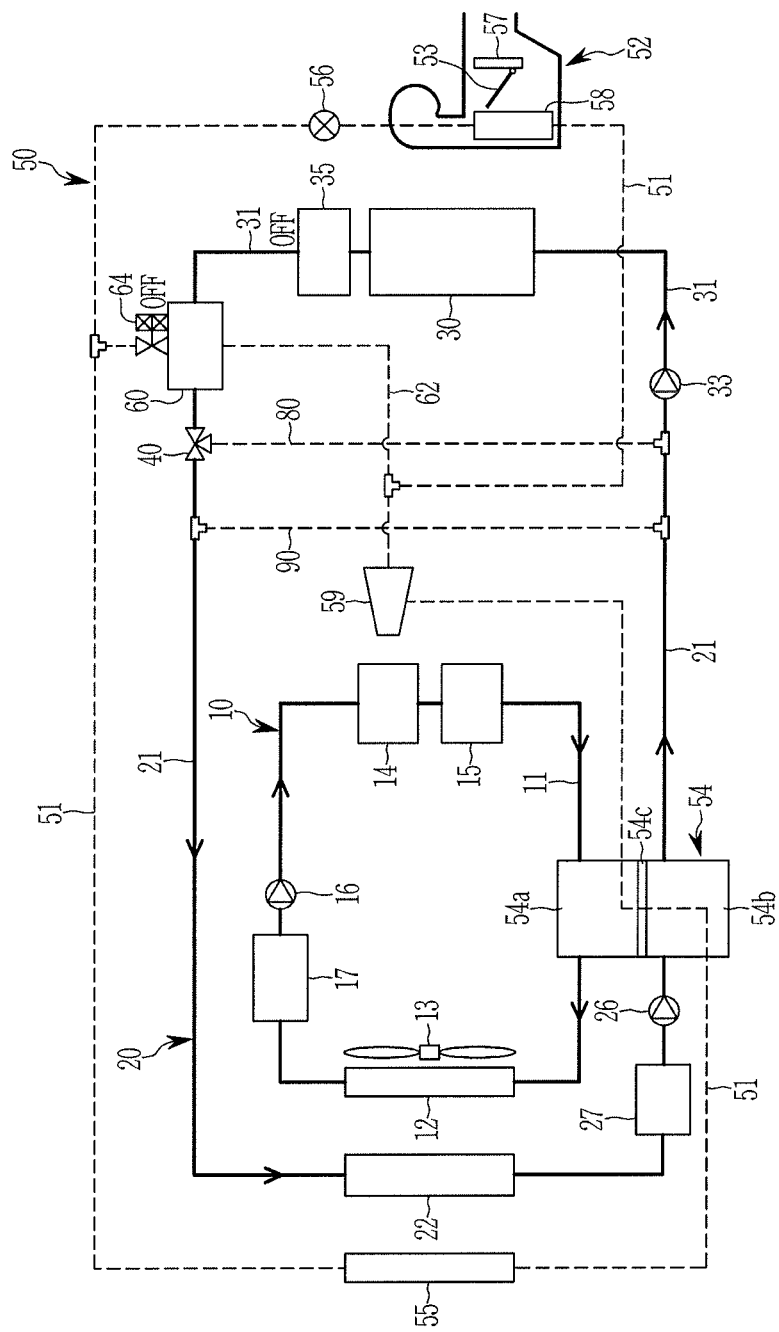
FIG. 2 is an operation state view at the time of cooling a battery module using a coolant in the battery cooling system for a vehicle according to an exemplary embodiment of the present invention.

FIG. 2 is an operation state view at the time of cooling a battery module using a coolant in the battery cooling system for a vehicle according to an exemplary embodiment of the present invention.

Referring to FIG. 2, in the first cooling device 10, the first water pump 16 is operated to cool the electrical component 14 and the motor 15. Accordingly, the coolant cooled by the first radiator 12 is circulated in the motor 14 and the electrical component 15.

In the second cooling device 20, the second water pump 26 is operated to cool the battery module 30.

Here, the valve 40 connects the second coolant line 21 and the battery coolant line 31 so that the coolant cooled by the second radiator 22 is supplied to the battery module 30.

At the same time, the first branch line 80 is closed through the operation of the valve 40. Furthermore, the second branch line 90 is closed. Accordingly, the second coolant line 21 and the battery coolant line 31 are connected by the closed first and second branch lines 80 and 90.

That is, the second coolant line 21 and the battery coolant line 31 are connected to each other by selective operation of the valve 40, and may form one closed circuit in which the coolant is circulated.

As a result, the coolant cooled by the second radiator 22 may be circulated along the second coolant line 21 and the batter coolant line 31 through the operations of the second water pump 26 and the third water pump 33.

That is, the cooled coolant discharged from the second radiator 22 flows into the battery module 30 through the battery coolant line 31 and cools the battery module 30.

The coolant that cools the battery module 30 passes through the heater 35 and the chiller 60 of which operation is turned off along the battery coolant line 31, and then flows into the second radiator again through the second coolant line 21.

That is, since a low-temperature coolant cooled by the second radiator 22 cools only the battery module 30, the battery module 30 may be efficiently cooled.

Meanwhile, the air conditioning device does not operate because the cooling mode of the vehicle does not operate.

When the battery module is cooled depending on the cooling mode of the vehicle, the operation will be described with reference to FIG. 3.

Figure 3:
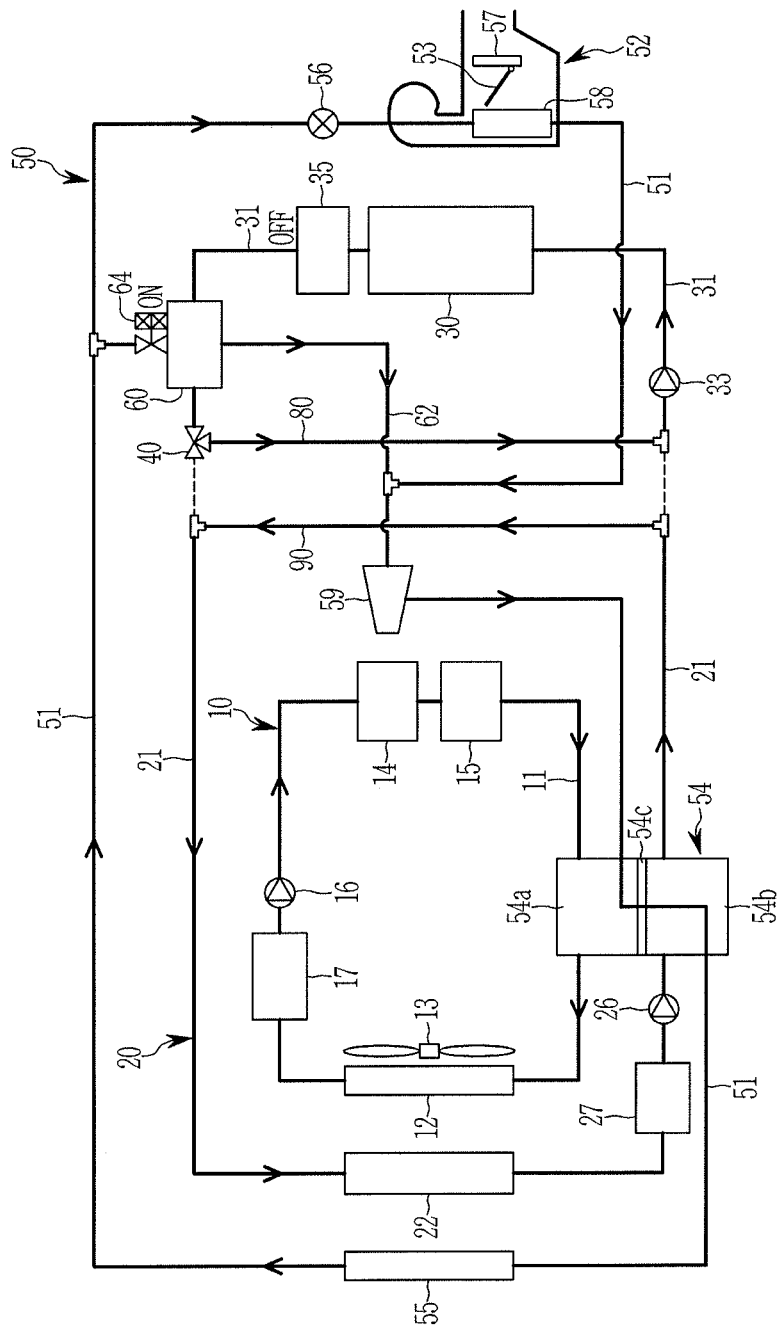
FIG. 3 is an operation state view at the time of cooling an electrical component and a battery module depending on a cooling mode of a vehicle in the battery cooling system for a vehicle according to an exemplary embodiment of the present invention.

FIG. 3 is an operation state view at the time of cooling an electrical component and a battery module depending on a cooling mode of a vehicle in the battery cooling system for a vehicle according to an exemplary embodiment of the present invention.

Referring to FIG. 3, in the first cooling device 10, the first water pump 16 is operated to cool the electrical component 14, the motor 15, and the condenser 54. Accordingly, the coolant cooled by the first radiator 12 is circulated in the motor 14, the electrical component 15, and the condenser 54.

That is, in the first cooling device 10, the coolant cooled by the first radiator 12 may be supplied to the condenser 54 through the operation of the first water pump 16.

In the second cooling device 20, the second water pump 26 is operated to supply the coolant to the condenser 54.

Meanwhile, the first branch line 80 is opened through the operation of the valve 40. Furthermore, the second branch line 90 is opened.

Accordingly, connection of the second coolant line 21 with the battery coolant line 31 is closed through the opened first and second branch lines 80 and 90 and the valve 40.

That is, in the second cooling device 20, the opened second branch line 90 is connected to the second coolant line 21 to independently form a closed circuit in which the coolant is circulated.

Furthermore, the battery coolant line 31 may form a closed circuit in which the coolant is circulated independently through the opened first branch line 80.

Accordingly, the coolant cooled by the second radiator 22 is circulated along the second coolant line 21 and the second branch line 90 to cool the condenser 54 through the operation of the second water pump 26.

Components of the air conditioning device are operated to cool the interior of the vehicle, and the refrigerant is thus circulated along the refrigerant line 51.

As a result, the condenser 54 condenses the refrigerant by use of the coolant which flows along the first and second coolant lines 11 and 21.

Meanwhile, the coolant supplied to the condenser 54 through the first coolant line 11 primarily condenses the refrigerant passing through the first heat dissipation unit 54a of the condenser 54. The coolant supplied to the condenser 54 through the second coolant line 21 secondarily condenses the refrigerant passing through the second heat dissipation unit 54b of the condenser 54.

As a result, the condenser 54 may increase a condensation amount of the refrigerant.

Furthermore, the coolant passing through the chiller 60 is circulated along the battery coolant line 31 and the first branch line 80 to cool the battery module 30 through the operation of the third water pump 33.

The coolant circulated along the battery coolant line 31 is cooled through heat exchange with the refrigerant supplied to the chiller 60. The coolant cooled by the chiller 60 is supplied to the battery module 30. As a result, the battery module 30 is cooled by the cooled coolant.

Here, the second expansion valve 64 expands some refrigerants among refrigerants passing through the sub-condenser 55 and opens the refrigerant connection line 62 to supply the expanded refrigerant to the chiller 60.

Therefore, some refrigerants discharged from the sub-condenser 55 are expanded through the operation of the second expansion valve 62 to enter a low-temperature state and flow into the chiller 60 connected to the refrigerant connection line 62.

As such, the refrigerant which flows into the chiller 60 exchanges heat with the coolant and flows into the compressor 59 through the refrigerant connection line 62.

That is, the coolant of which temperature is raised while cooling the battery module 30 is cooled through heat exchange with a low-temperature and low-pressure refrigerant inside the chiller 60. The cooled coolant is supplied to the battery module 30 again through the battery coolant line 31.

That is, the coolant may efficiently cool the battery module 30 while repeatedly performing the operations described above.

Meanwhile, the remaining refrigerant discharged from the sub-condenser 55 flows through the refrigerant line 51 to cool the interior of the vehicle, and passes through the first expansion valve 56, the evaporator 58, the compressor 59, and the condenser 54 in sequence.

Here, the outside air flowing into the HVAC module 52 is cooled while passing through the evaporator 58 by the low-temperature refrigerant which flows into the evaporator 58.

In the instant case, the opening/closing door 53 closes a portion where the cooled outside air passes through the internal heater 57 to prevent the cooled outside air from passing through the internal heater 57. Therefore, the cooled outside air flows directly into the vehicle, cooling the interior of the vehicle.

Meanwhile, a refrigerant having an increased condensation amount while sequentially passing through the condenser 54 and the sub-condenser 55 is expanded and supplied to the evaporator 58, so that the refrigerant may be evaporated at a lower temperature.

That is, in the exemplary embodiment of the present invention, the first and second heat dissipation units 54a and 54b of the condenser 54 primarily and secondarily condense the refrigerant and the sub-condenser 55 additionally condenses the refrigerant, and as a result, sub-cooling of the refrigerant becomes advantageous.

Furthermore, as the refrigerant of which sub-cooling is performed is evaporated in the evaporator 58 at a lower temperature, the temperature of the coolant which exchanges heat in the evaporator 58 may be further lowered, enhancing cooling performance and efficiency.

That is, the refrigerant cools the coolant through heat exchange while passing through the chiller 60 while cooling the interior in the cooling mode of the vehicle while repeatedly performing the aforementioned process.

The coolant cooled by the chiller 60 flows along the battery coolant line 31 connected to the valve 40 through the operation of the valve 40, and flows into the battery module 30. As a result, the battery module 30 may be efficiently cooled by the low-temperature coolant supplied to the battery coolant line 31.

In the exemplary embodiment of the present invention, for when the battery module is heated, the operation will be described with reference to FIG. 4.

Figure 4:
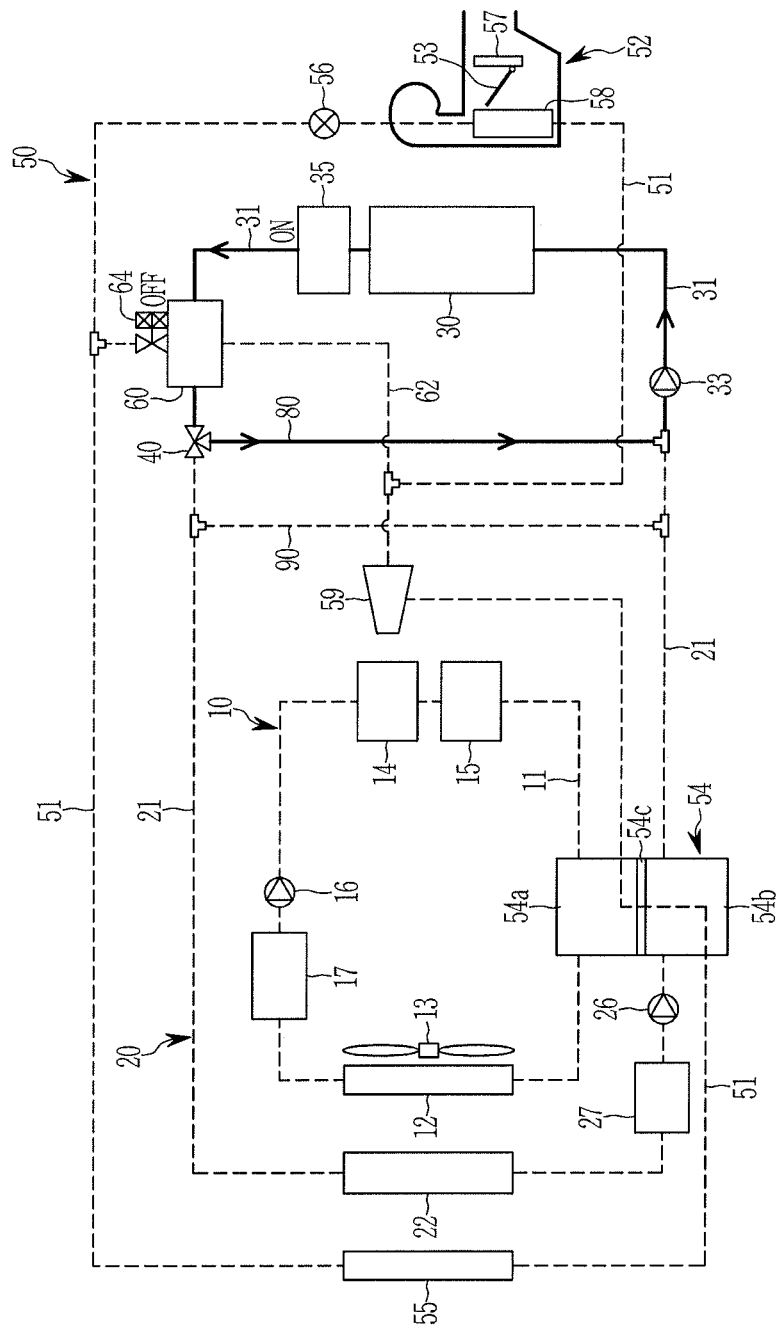
FIG. 4 is an operation state view at the time of heating a battery module in the battery cooling system for a vehicle according to various exemplary embodiments of the present invention.

FIG. 4 is an operation state view at the time of heating a battery module in the battery cooling system for a vehicle according to various exemplary embodiments of the present invention.

Referring to FIG. 4, the operations of the first and second water pumps 16 and 26 are stopped in the first cooling device 10 and the second cooling device 20. As a result, the flowing of the coolant is stopped in the first and second coolant lines 11 and 21. Furthermore, the operation of the air conditioning device is stopped.

In such a state, the first branch line 80 is opened through the operation of the valve 40. Furthermore, connection of the battery coolant line 31 with the second coolant line 21 is closed through the operations of the opened first branch line 80 and the valve 40.

As a result, the battery coolant line 31 connected to the battery module 30 may form a closed circuit in which the coolant is circulated independently through the opened first branch line 80.

As such, the coolant is circulated in the battery coolant line 31 through the operation of the third water pump 33. In the instant case, the heater 35 is turned on to heat the coolant circulated in the battery coolant line 31.

The coolant of which temperature is raised while passing through the heater 35 flows into the battery module 30 through the first branch line 80 and the battery coolant line 31. As a result, the battery module 30 may be efficiently heated by the high-temperature coolant supplied to the battery coolant line 31.

As described above, according to an exemplary embodiment of the present invention, by a battery cooling system for a vehicle, a battery module is efficiently heated or cooled by use of the chiller in which the coolant and the refrigerant exchange heat in the electric vehicle, facilitating simplification of the system.

Furthermore, according to an exemplary embodiment of the present invention, the battery module 30 is efficiently heated or cooled, facilitating optimal performance of the battery module 30 and increasing the overall driving distance of the vehicle through efficient management of the battery module 30.

Furthermore, according to an exemplary embodiment of the present invention, the refrigerant is dually condensed by use of the coolant supplied to each of the first and second cooling devices 10 and 20 from the condenser 54 to enhance condensation performance, and the refrigerant is additionally condensed through the sub-condenser 55 to enhance the cooling performance and reduce power consumption.

Furthermore, according to an exemplary embodiment of the present invention, manufacturing cost may be reduced and weight may be reduced through simplification of an entire system, and spatial utilization may be enhanced.

The battery cooling system for a vehicle according to various exemplary embodiments of the present invention will be described with reference to FIG. 5.

Figure 5:
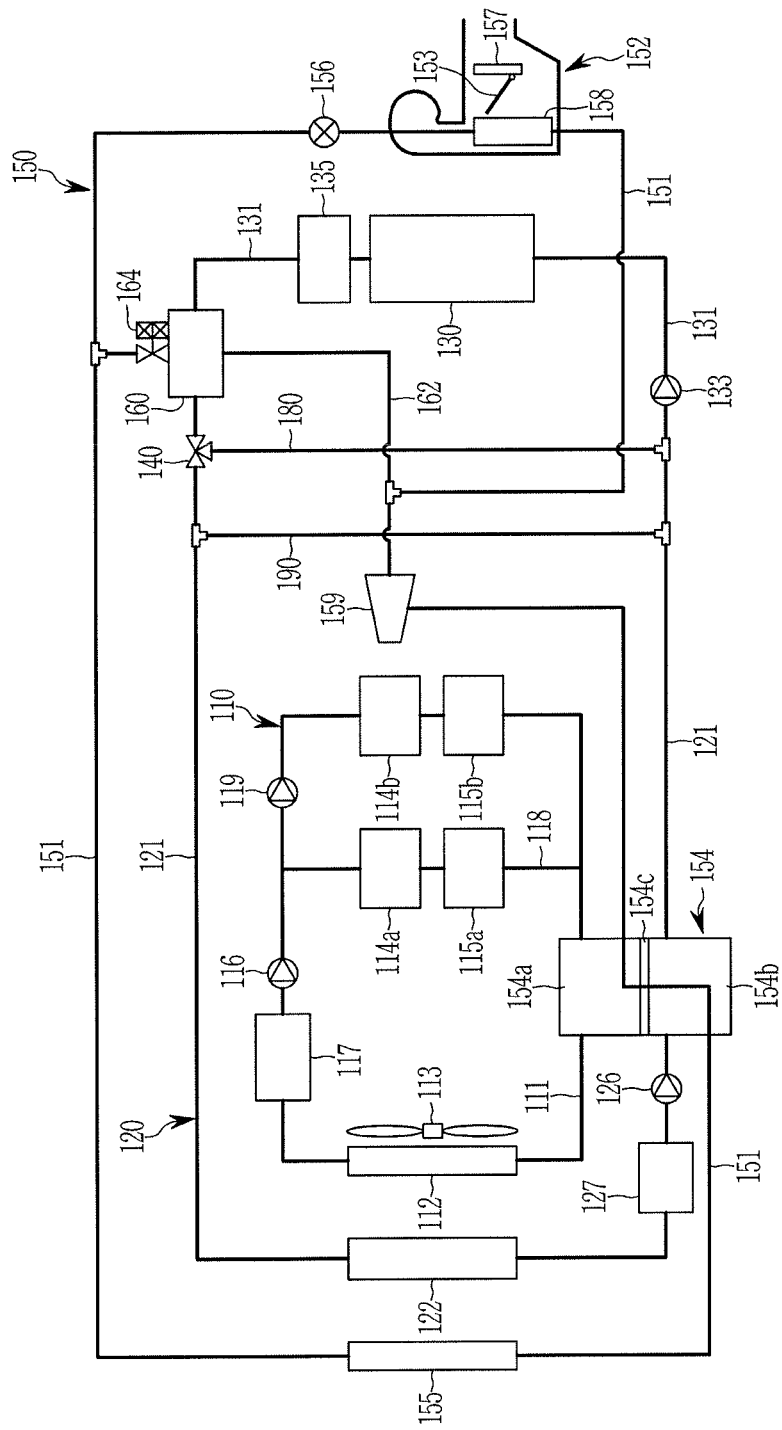
FIG. 5 is a block diagram of a battery cooling system for a vehicle according to various exemplary embodiments of the present invention.

FIG. 5 is a block diagram of a battery cooling system for a vehicle according to various exemplary embodiments of the present invention.

Referring to FIG. 5 the battery cooling system includes first and second cooling devices 110 and 120, a battery module 130, and a chiller 160.

First, the first cooling device 110 includes a first radiator 112 and a first water pump 116 connected through a first coolant line 111. The first cooling device 110 circulates the coolant to the first coolant line 111 by operating the first water pump 116 to cool the electrical component and the motor.

The first radiator 112 is disposed in the front of the vehicle, and a cooling fan 113 is provided in the rear of the first radiator to cool the coolant through the operation of the cooling fan 113 and heat exchange with outside air.

Here, the driving motor may be constituted by first and second driving motors 115a and 115b to correspond to a front wheel and a rear wheel, respectively.

Furthermore, the electrical component may be constituted by two electrical components, and first and second electrical components 114a and 114b to correspond to the two driving motors, that is, the first and second driving motors 115a and 115b, respectively.

In the exemplary embodiment of the present invention, the first electrical component 114a and the first motor 115a may be disposed in parallel with the second electrical component 114b and the second motor 115b provided in the first coolant line 111 through a branch line 118 provided in the first coolant line 111 by bypassing the second electrical component 114b and the second motor 115.

That is, each of one end portion and the other end portion of the branch line 118 may be connected to the first coolant line 111 between the first radiator 112 and the second electrical component 114b.

Here, the first water pump 116 may be disposed on the first coolant line 111 close to the first radiator 112 based on the branch line 118, and a sub-water pump 119 may be mounted on the first coolant line 111 connected to the second electrical component 114b and the motor 115b based on the branch line 118.

The sub-water pump 119 may be applied to prevent a shortage phenomenon of a coolant flow rate due to an increase in flow resistance of the coolant which is circulated in the first coolant line 111 and the branch line 118.

Meanwhile, the first and second electrical components 114a and 114b may include a power control device, an inverter, or an on board charger (OBC). The power control device and the inverter may dissipate heat while driving, and the OBC may dissipate heat when the battery module 130 is charged.

Furthermore, a first reservoir tank 117 is mounted on the first coolant line 111 between the first radiator 112 and the first water pump 116. The coolant cooled by the first radiator 112 may be stored in the first reservoir tank 117.

The first cooling device 110 configured as such circulates the coolant cooled by the first radiator along the first coolant line 111 and the branch line 118 by operating the first water pump 116 and the sub-water pump 119 to cool the first and second electrical components 114a and 114b and the first and second motors 115a and 115b to not be overheated.

In the exemplary embodiment of the present invention, the second cooling device 120 includes a second radiator 122 and a second water pump 126 connected through a second coolant line 121, and it circulates the coolant to the second coolant line 121.

The second cooling device 120 may supply the coolant cooled by the second radiator 122 to the battery module 130.

The second radiator 122 is disposed in front of the first radiator 112, and cools the coolant through the operation of the cooling fan 113 and heat exchange with the outside air.

Furthermore, a second reservoir tank 127 is mounted on the second coolant line 21 between the second radiator 122 and the second water pump 126. The coolant cooled by the second radiator 122 may be stored in the second reservoir tank 127.

The second cooling device 120 configured as such may circulate the coolant cooled by the second radiator 122 along the second coolant line 121 by operating the second water pump 126.

The battery module 130 is mounted on a battery coolant line 131 selectively connectable to the second coolant line 121 through a valve 140.

Here, the valve 140 may selectively connect the second coolant line 121 and the battery coolant line 131 between the second radiator 122 and the battery module 130.

The battery module 130 is formed as a water-cooled type in which electric power is supplied to the first and second electrical components 114a and 114b and the first and second motors 115a and 115b, which are cooled by the coolant flowing along the battery coolant line 131.

That is, the battery module 130 is selectively connectable to the second cooling device 120 through the battery coolant line 131 according to the operation of the valve 140. In the battery module 130, the coolant may be circulated through the operation of a third water pump 133 mounted on the battery coolant line 131.

The third water pump 133 is mounted on the battery coolant line 131 between the chiller 160 and the battery module 130. The third water pump 133 operates to circulate the coolant through the battery coolant line 131.

Here, the first, second, and third water pumps 116, 126, and 133 may be electric water pumps.

In the exemplary embodiment of the present invention, the chiller 160 is mounted on the battery coolant line 131, and the coolant passes through the internal to the chiller 160 and the chiller 160 is connected to the refrigerant line 151 of an air conditioning device 150 through a refrigerant connection line 162.

The chiller 160 makes the coolant selectively flowing into the chiller 60 exchange heat with the refrigerant supplied from the air conditioning device 150 to control a temperature of the coolant. Here, the chiller 160 may be a water-cooled type of heat exchanger in which coolant flows into the chiller 160.

Meanwhile, in the exemplary embodiment of the present invention, a heater 135 may be mounted on the battery coolant line 131 between the battery module 130 and the chiller 160.

When the battery module 130 is required to be heated, the heater 135 is turned on to heat the coolant circulated in the battery coolant line 131 so that the coolant of which temperature is raised is made to flow into the battery module 130.

Meanwhile, a first branch line 180 may be mounted on the battery coolant line 131, which connects each battery coolant line 131 between the chiller 160 and the battery module 130 through the valve 140.

Furthermore, a second branch line 190 is mounted on the second coolant line 121, which separates the battery coolant line 131 and the second coolant line 121 from each other.

The second branch line 190 may be selectively connectable to the second coolant line 121 so that the second cooling device 120 forms an independent closed circuit through the second coolant line 121.

Meanwhile, a separate valve may be provided at a point where the second branch line 190 intersects the second coolant line 121 and the battery coolant line 131, or on the second branch line 190. Such a valve may be a 3-way or 2-way valve.

Here, the valve 140 selectively connects the second coolant line 121 and the battery coolant line 135 or selectively connects the battery coolant line 135 and the first branch line 180 to control the flow of the coolant.

That is, when the battery module 130 is cooled using the coolant cooled by the second radiator 121, the valve 140 may connect the second coolant line 121 connected to the second radiator 121 and the battery coolant line 131 and close the first branch line 180.

Furthermore, when the battery module 130 is to be heated or when the battery module 130 is cooled by use of the coolant which exchanges heat with the refrigerant, the valve 140 may open the first branch line 180 and close the connection between the second coolant line 121 and the battery coolant line 131.

Accordingly, low-temperature coolant that has exchanged heat with the refrigerant in the chiller 160 flows into the battery module 130 through the first branch line 180 opened by the valve 140, efficiently cooling the battery module 130.

On the other hand, when the battery module 130 is heated, the coolant circulated along the battery coolant line 131 through the operation of the valve 140 is prevented from flowing into the second radiator 122 to make the coolant heated through the operation of the heater 135 flow into the battery module 130, rapidly heating the battery module 130.

Meanwhile, in the exemplary embodiment of the present invention, it is described that the valve is not configured in the second branch line 190 as an exemplary embodiment of the present invention, but the present invention is not limited thereto, and the valve is applicable as necessary for selective opening of the second branch line 190.

That is, the second branch line 190 may control a flow rate of the coolant circulated through the operations of the second coolant line 121, the battery coolant line 131, and the first branch line 180 selectively connectable according to each mode (heating, cooling, or humidifying) of the vehicle and the second and third water pumps 126 and 133, thereby controlling opening and closing of the second branch line 190.

Meanwhile, in the exemplary embodiment of the present invention, the air conditioning device 150 includes a Heating, Ventilation, and Air Conditioning (HVAC) module 152, a condenser 154, a first expansion valve 156, an evaporator 158, and a compressor 159 connected through the refrigerant line 151.

First, the HVAC module 152 has therein an opening/closing door 153 connected through the refrigerant line 151 and controlling the outside air passing through the evaporator 158 to selectively flow into an internal heater 157 according to the heating, cooling, and heating/humidifying modes.

That is, the opening/closing door 153 is opened so that the outside air passing through the evaporator 158 flows into the internal heater 157 in the heating mode of the vehicle. On the other hand, in the cooling mode of the vehicle, the opening/closing door 153 closes the internal heater 157 so that the outside air which is cooled while passing through the evaporator 158 directly flows into the vehicle.

The condenser 154 is connected to the refrigerant line 151 so that the refrigerant passes through the refrigerant line 151, and the condenser 154 is connected to each of the first and second coolant lines 111 and 121 so that the coolant is circulated in each of the first and second cooling devices 110 and 120.

That is, the condenser 154 may be a water-cooled type of heat exchanger in which coolant flows into the condenser 154. The condenser 154 may include a first heat dissipation unit 154a, a second heat dissipation unit 154b, and a partition 154c.

First, the first heat dissipation unit 154a is connected to the first coolant line 111. As a result, the first heat dissipation unit 154a may make the refrigerant supplied from the compressor 159 primarily exchange heat with the coolant supplied from the first cooling device 110.

The second heat dissipation unit 154b is connected to the second coolant line 121. As a result, the second heat dissipation unit 154b may make the refrigerant passing through the first heat dissipation unit 154a secondarily exchange heat with the coolant supplied from the second cooling device 120.

Furthermore, the partition wall 154c may partition the first heat dissipation unit 154a and the second heat dissipation unit 154b in the condenser 154 to prevent the coolant supplied from each of the first cooling device 110 and the second cooling device 120 from being mixed. The partition 154c may make the refrigerant pass so that the refrigerant flows into the second heat dissipation unit 154b from the first heat dissipation unit 154a.

Therefore, the refrigerant that passes through the condenser 154 may primarily exchange heat with the coolant supplied through the first coolant line 111 and secondarily exchange heat with the coolant supplied through the second coolant line 121.

That is, the condenser 154 makes the refrigerant supplied from the compressor 159 primarily exchange heat with the coolant supplied from the first cooling device 110 to condense the refrigerant. As such, the condenser 154 makes the refrigerant secondarily exchange heat with the coolant supplied from the second cooling device 120 to condense the refrigerant. Through such an operation, the condenser 154 may lower the temperature of the refrigerant and increase the condensation amount.

Meanwhile, a sub-condenser 155 for additionally condensing the refrigerant passing through the condenser 154 may be mounted on the refrigerant line 151 between the condenser 154 and the evaporator 158.

The sub-condenser 155 is disposed in front of the second radiator 122, and exchanges heat between the refrigerant flowing into the sub-condenser 55 and the outside air.

Accordingly, the sub-condenser 155 further condenses the refrigerant condensed by the condenser 154 to increase sub-cooling of the refrigerant, and as a result, a coefficient of performance (COP) which is a coefficient of cooling performance to power required by the compressor may be enhanced.

In the exemplary embodiment of the present invention, the first expansion valve 156 is mounted on the refrigerant line 151 connecting the sub-condenser 155 and the evaporator 158. The first expansion valve 156 receives and expands the refrigerant passing through the sub-condenser 155.

The compressor 159 is connected between the evaporator 158 and the condenser 154 through the refrigerant line 151. The compressor 159 compresses a gaseous refrigerant.

Meanwhile, a second expansion valve 164 may be mounted on the refrigerant connection line 162.

That is, the second expansion valve 164 is mounted on the refrigerant connection line 162 connecting the sub-condenser 155 and the chiller 160.

Here, the second expansion valve 164 is operated when the battery module 130 is cooled by the refrigerant in the cooling mode of the vehicle. The second expansion valve 164 may expand the refrigerant flowing through the refrigerant connection line 162 and make the expanded refrigerant flow into the chiller 160.

That is, the second expansion valve 164 expands the condensed refrigerant discharged from the sub-condenser 155 and makes the expanded refrigerant flow into the chiller 160 in a state in which the refrigerant is lowered in temperature, further lowering a temperature of the coolant passing through the internal to the chiller 160.

Accordingly, the coolant having the lowered temperature flows into the battery module 130 while passing through the chiller 160, so that the battery module may be cooled more efficiently.

As described above, according to an exemplary embodiment of the present invention, by the battery cooling system for a vehicle, the battery module 130 is efficiently heated or cooled by use of the chiller 160 in which the coolant and the refrigerant exchange heat in the electric vehicle, facilitating simplification of the system.

Furthermore, according to an exemplary embodiment of the present invention, the battery module 130 is efficiently heated or cooled, facilitating optimal performance of the battery module 130 and increasing the overall driving distance of the vehicle through efficient management of the battery module 130.

Furthermore, according to an exemplary embodiment of the present invention, the refrigerant is dually condensed by use of the coolant supplied to each of the first and second cooling devices 110 and 120 from the condenser 154 to enhance condensation performance, and the refrigerant is additionally condensed through the sub-condenser 155 to enhance the cooling performance and reduce power consumption.

Furthermore, according to an exemplary embodiment of the present invention, manufacturing cost may be reduced and weight may be reduced through simplification of an entire system, and spatial utilization may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery cooling system for a vehicle, the battery cooling system comprising:
   a first cooling device including a first radiator and a first water pump connected through a first coolant line and circulating a first coolant in the first coolant line to cool at least one electrical component and at least one motor mounted on the first coolant line;
   a second cooling device including a second radiator and a second water pump connected through a second coolant line and circulating a second coolant in the second coolant line;
   a battery module mounted on a battery coolant line configured to be selectively connectable to the second coolant line through a valve mounted between the battery coolant line and the second coolant line; and
   a chiller mounted on the battery coolant line and through which the second coolant passes, connected to a refrigerant line of an air conditioning device through a refrigerant connection line connected to the refrigerant line, and configured for making the second coolant which selectively flows exchange heat with a refrigerant supplied from the air conditioning device through the refrigerant connection line to control a temperature of the second coolant,
   wherein a condenser provided in the air conditioning device is connected to each of the first and second coolant lines so that the first coolant circulated in the first coolant line and the second coolant circulated in the second coolant line pass through the first and second cooling devices, respectively,
   wherein the refrigerant passing through the condenser via the refrigerant line exchanges heat with the first coolant supplied through the first coolant line and exchanges heat with the second coolant supplied through the second coolant line, wherein the air conditioning device includes:
an HVAC module including an evaporator connected to the refrigerant line and having a door for controlling outside air passing through the evaporator to selectively flow to the evaporator;
a compressor connected to the evaporator through the refrigerant line;
a first expansion valve mounted on the refrigerant line connecting the condenser and the evaporator; and
a second expansion valve mounted on the refrigerant connection line, and wherein the valve selectively connects the second coolant line and the battery coolant line between the second radiator and the chiller, wherein a first branch line, a first end of which is connected to the valve and a second end of which is mounted on a portion of the battery coolant line by bypassing the chiller and the battery module, is selectively connectable to the chiller and the battery module by operation of the valve, and wherein a second branch line is mounted on first and second portions of the second coolant line by bypassing the valve and configured for separating the battery coolant line and the second coolant line.

2. The battery cooling system of claim 1, wherein, on the refrigerant line between the condenser and the evaporator, a sub-condenser for additionally condensing the refrigerant passing through the condenser is provided.

3. The battery cooling system of claim 1, wherein the second expansion valve is operated when the battery module is cooled by the refrigerant, and the second expansion valve expands the refrigerant which flows through the refrigerant connection line and makes the expanded refrigerant flow into the chiller.

4. The battery cooling system of claim 1, wherein, when the battery module is cooled by use of the second coolant cooled by the second radiator, the valve connects the second coolant line and the battery coolant line and closes the first branch line.

5. The battery cooling system of claim 1, wherein,
when the battery module is cooled in a cooling mode of the vehicle,
in the first cooling device, the first coolant is circulated in the at least one electrical component and the at least one motor through an operation of the first water pump,
the first branch line is opened through an operation of the valve, the second branch line is opened, and connection between the second coolant line and the battery coolant line is closed by the opened first and second branch lines, and
in the air conditioning device, the refrigerant is circulated through the refrigerant line and the second expansion valve operates so that the expanded refrigerant flows into the chiller.

6. The battery cooling system of claim 5, wherein, in the first cooling device, the first coolant cooled by the first radiator is supplied to the condenser through an operation of the first water pump.

7. The battery cooling system of claim 5, wherein,
in the second cooling device,
the opened second branch line is connected to the second coolant line to form an independent closed circuit, and the second coolant cooled by the second radiator is supplied to the condenser through an operation of the second water pump.

8. The battery cooling system of claim 1, wherein,
when the battery module is heated,
the operations of the first and second cooling devices and the air conditioning device are stopped, and
the first branch line is opened through an operation of the valve and the connection between the second coolant line and the battery coolant line is closed by the opened first branch line.

9. The battery cooling system of claim 1,
wherein a heater is mounted on the battery coolant line between the battery module and the chiller, and
wherein the heater is turned on when heating the battery module and heats the second coolant circulated in the battery coolant line, which flows into the battery module.

10. The battery cooling system of claim 1, wherein the condenser includes:
a first heat dissipation unit connected to the first coolant line;
a second heat dissipation unit connected to the second coolant line; and
a partition partitioning the inside of the condenser into the first heat dissipation unit and the second heat dissipation unit to prevent the first and second coolants supplied from the first and second cooling devices, respectively, from being mixed and allowing the refrigerant to pass through the first and second heat dissipation units via the refrigerant line.

11. The battery cooling system of claim 1, wherein the condenser and the chiller are each a water-cooled heat exchanger in which the second coolant flows into the condenser and the chiller.

12. The battery cooling system of claim 1, wherein the second radiator is mounted in a front of the first radiator based on front and rear directions of the vehicle.

13. The battery cooling system of claim 1,
wherein a first reservoir tank is mounted on the first coolant line between the first radiator and the first water pump, and
wherein a second reservoir tank is mounted on the second coolant line between the second radiator and the second water pump.

14. The battery cooling system of claim 1, wherein the valve is a three- way valve.

15. The battery cooling system of claim 1, wherein the at least one electrical component and the at least one motor are mounted on the first coolant line in series.

16. The battery cooling system of claim 1,
wherein the at least one motor is constituted by two motors corresponding to a front wheel and a rear wheel, respectively,
wherein the at least one electrical component is constituted by two electrical components to correspond to the two motors, respectively, and
wherein of the two motors and two electrical components, a first motor and a first electrical component are mounted on the first coolant line and a second motor and a second electrical component are mounted on a third branch line connecting first and second portions of the first coolant line by bypassing the first motor and the first electrical component.

17. The battery cooling system of claim 16,
wherein the first water pump is mounted on a third portion of the first coolant line adjacent to the first radiator based on the third branch line, and
wherein a sub-water pump is mounted on a fourth portion of the first coolant line connected to the first motor and the first electrical component based on the branch line.

18. The battery cooling system of claim 1, wherein a sub-condenser is an air-cooled heat exchanger mounted in a front of the second radiator.

* * * * *